United States Patent [19]

Duncan

[11] Patent Number: 4,836,519

[45] Date of Patent: Jun. 6, 1989

[54] MACHINIST'S CLAMP

[76] Inventor: Michael J. Duncan, 41 Commodore Estates, Middletown, Del. 19709

[21] Appl. No.: 177,136

[22] Filed: Apr. 4, 1988

[51] Int. Cl.[4] .................. B23G 3/02

[52] U.S. Cl. .................. 269/91; 269/254 R

[58] Field of Search .................. 269/91–94, 269/99, 254 R

[56] References Cited

U.S. PATENT DOCUMENTS

| | | | |
|---|---|---|---|
| 1,072,363 | 9/1913 | Roberts | 269/94 |
| 1,420,147 | 6/1922 | Roberts | 269/94 |
| 3,623,718 | 11/1971 | Thomeczek, Sr. | 269/91 |

FOREIGN PATENT DOCUMENTS

| | | | |
|---|---|---|---|
| 1220918 | 3/1986 | U.S.S.R. | 269/94 |

*Primary Examiner*—Frederick R. Schmidt
*Assistant Examiner*—Judy J. Hartman
*Attorney, Agent, or Firm*—Mortenson & Uebler

[57] ABSTRACT

An improved, inexpensive machinist's clamp apparatus for holding metal workpieces during milling, drilling, shaping or the like is provided. The improved clamp apparatus has a generally "U"-shaped holder removeably affixed to the rear end of a step clamp to be used in conjunction with a step block. Through the "U"-bend is threadingly inserted a thumbscrew having a resilient endpiece affixed thereon, such as a spring or a rubber pad. When the step clamp is adjusted to the desired height on the step block, the thumb-screw is advanced such that the resilient end thereof is forced into tight holding contact with the rear vertical face of the step block, resulting in a combination of step clamp, step block and holder which is rigidly attached so that, when a workpiece is removed, the step clamp does not fall away from the step block, thereby avoiding unnecessary time delays in re-setup. Also provided is a new step block base holder for affixing the step block to the work surface. The holder provides for longitudinal and rotational adjustment of the clamp apparatus with respect to the work surface. A plate of a soft metal or plastic may be affixed to the front end of the step clamp for use in machining workpieces of metals which may be marked or scored by standard heat-treated steel step block clamps.

7 Claims, 2 Drawing Sheets

MACHINIST'S CLAMP

BACKGROUND OF THE INVENTION

This invention relates to a machinist's clamp for holding metal workpieces during shaping, as by milling, drilling or the like. Such workpieces must be firmly affixed to machine tools having work surfaces with "T" slots therein. Various clamping devices are known for this purpose. More particularly, this invention relates to a clamping device for such workpieces which remains rigidly attached during loading and unloading various workpieces. The invention provides a clamp means which can greatly save setup time when clamping new workpieces resulting in greatly increased efficiency of operation.

Clamping devices for holding metal workpieces during shaping are known, as shown in FIGS. 6 and 7. Therein, step clamp 16 is shown in conjunction with step block 32 held together by bolt 42 and nut 56. Spring mechanism 54 is said to hold the clamp 16 and block 32 together when the nut 54 is loosened, as shown, and the workpiece 50 is removed. These prior art clamping devices are not entirely satisfactory in that the clamp often disengages from the block anyway, and re-setup is delayed. If the new workpiece has a significantly different height from the old and the clamps disengage as they are being adjusted, rather than saving time in re-setup, such device may actually result in an increased time required for re-setup.

The present invention overcomes the aforesaid disadvantages of the prior, known clamps. In addition, an improved step block holder, for use with "T"-slotted machine tables is provided. Also, a plate of a soft metal or plastic affixed to the clamping end of the step clamp is contemplated for use in clamping relatively soft metal workpieces.

SUMMARY OF THE INVENTION

Machinist's clamp apparatus is provided comprising a step clamp having a forward end for holding a workpiece and a rear end having a "U"-shaped holder removeably affixed thereto for affixing the step clamp to a step block, and means for longitudinally and vertically adjusting the forward end of the step clamp to provide for securing and releasing the workpiece to and from a work surface. The means for affixing the step clamp to the step block comprises a generally "U"-shaped holder assembly affixed to the rear end of the step clamp which is removeably attachable to the step block, the holder having thumbscrew means threadingly inserted through the "U"-bend, the thumbscrew means having a thumb adjustment at the end external to the "U"-bend and having a resilient endpiece affixed to the end internal to the "U"-bend. when the step clamp is adjusted to a desired height on the step block and the thumbscrew assembly is advanced such that the resilient end thereof is forced into tight holding contact with the rear vertical face of the step block, a rigid combination of step clamp, step block and holder is provided such that, when a workpiece is removed from the apparatus, the step clamp does not fall away from the step block, thereby avoiding unnecessary time delays in re-setup. The resilient endpiece may be a spring or a rubber pad. The step block preferably is affixed to a step block holder. The step block holder comprises a base plate having an opening adjacent one end thereof and means for affixing the step block to the base plate. The means for longitudinally and vertically moving the step clamp preferably is a vertical bolt extending through the opening of the step block holder, the bolt, in combination with a nut threadingly engaged therewith, comprising means for removeably attaching the forward end of the step clamp, the step block holder and the work surface, thereby providing for precise longitudinal and rotational adjustment of the clamp apparatus. Preferably, the apparatus has a plate of a relatively soft material affixed to the forward end of the step clamp, which plate contacts the workpiece when the apparatus is in use. The plate preferably is aluminum or plastic.

DETAILED DESCRIPTION OF THE INVENTION AND PREFERRED EMBODIMENTS WITH REFERENCE TO THE DRAWINGS

An improved, inexpensive machinist's clamp apparatus for holding metal workpieces during milling, drilling, shaping or the like is provided. The improved clamp apparatus has a generally "U"-shaped holder removeably affixed to the rear end of a step clamp to be used in conjunction with a step block. Through the "U"-bend is threadingly inserted thumbscrew means having a resilient endpiece affixed thereon, such as spring means or a rubber pad. When the step clamp is adjusted to the desired height on the step block, the thumbscrew is advanced such that the resilient end thereof is forced into tight holding contact with the rear vertical face of the step block, resulting in a combination of step clamp, step block and holder which is rigidly attached so that, when a workpiece is removed, the step clamp does not fall away from the step block, thereby avoiding unnecessary time delays in re-setup. Also provided is a new step block base holder for affixing the step block to the work surface. The holder provides means for longitudinal and rotational adjustment of the clamp apparatus with respect to the work surface. A plate of soft metal or plastic may be affixed to the front end of the step clamp for use in machining workpieces of metals which may be marked or scored by standard heat-treated steel step block clamps.

Figure 6:
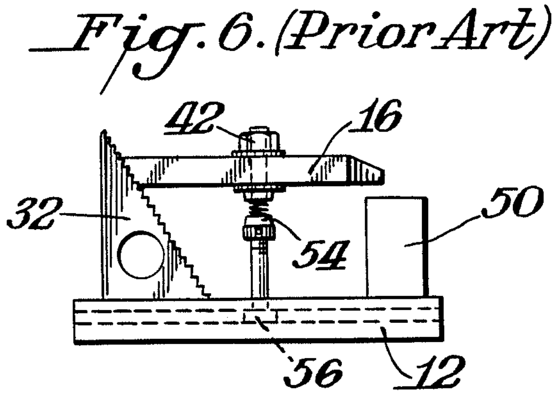
Fig. 6. (Prior Art)
FIG. 6 is a side elevation of a known prior art clamp apparatus.
Figure 7:
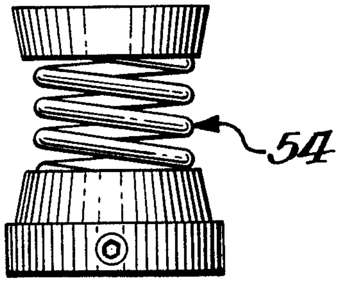
Fig. 7. (Prior Art)
FIG. 7 is an elevational view of spring means used in connection with the clamp apparatus of FIG. 6.

A detailed description of the invention and preferred embodiments is best provided with reference to the drawings. FIGS. 6 and 7 have been described above and depict known clamp apparatus.

Figure 1:
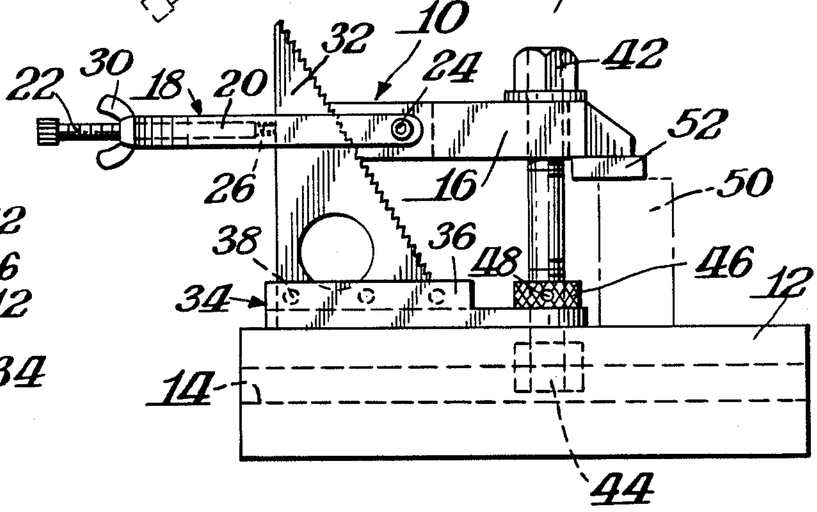
FIG. 1 is a side elevation of the clamp apparatus according to the invention.

FIG. 1 is an elevational view of the clamp apparatus 10 according to the invention. Work surface 12 has a "T" slot 14 therein for affixing a workpiece 50 to the work surface 12 by the clamp apparatus 10. The clamp apparatus 10 includes step clamp 16 removeably affixed to step block 32 by step clamp holding means 18. The holder 18 includes a "U"-bracket 20 affixed to step clamp 16 by threaded screws 24. The "U"-bracket 20 is installed over the step block 32 as shown and manually adjusted to the desired height for a given workpiece 50, shown in phantom. Threaded thumbscrew 22 is threadingly engaged with "U"-bracket 20 through the "U"-bend. Thumbscrew 22 has resilient means 26, such as a spring or elastomeric pad, affixed to its inner end by means of extension 28, to be discussed further below.

As the threaded thumbscrew 22 is advanced, it contacts the rear surface of step block 32, and the resilient end 26 is forced into tight holding contact with the rear, vertical face of the step block 32. Wing nut 30 is tightened to lock the step block 32 and step clamp 16 together in rigid attachment.

Figure 5:
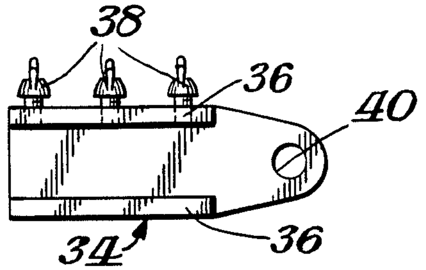
FIG. 5 is a top plan view of step block holder of the invention.

Still referring to FIG. 1, step block 32 is carried on step block holder 36 and ridigly attached thereto between rails 36 by means of wing bolts 38. This step block holder 36 is shown in FIG. 5, to be discussed in detail below.

Still referring to FIG. 1, bolt 42 extends through step clamp 16, through an opening in the step block holder 36 and into the "T" slot 14 of the work surface 12, where it is held in place by nut 44. When all is in alignment, workpiece 50 is firmly held to work surface 12 by tightening nut 44 and knurled ring 46, the latter being threadingly engaged with bolt 42. Opening 48 allows for tightening of knurled ring 46.

Also shown in FIG. 1 is optional plate 52 which may be attached as shown to step clamp 16. This plate is of a soft material such as plastic or aluminum, and is used when machining soft metals to avoid marking or scoring the workpiece.

Figure 2:
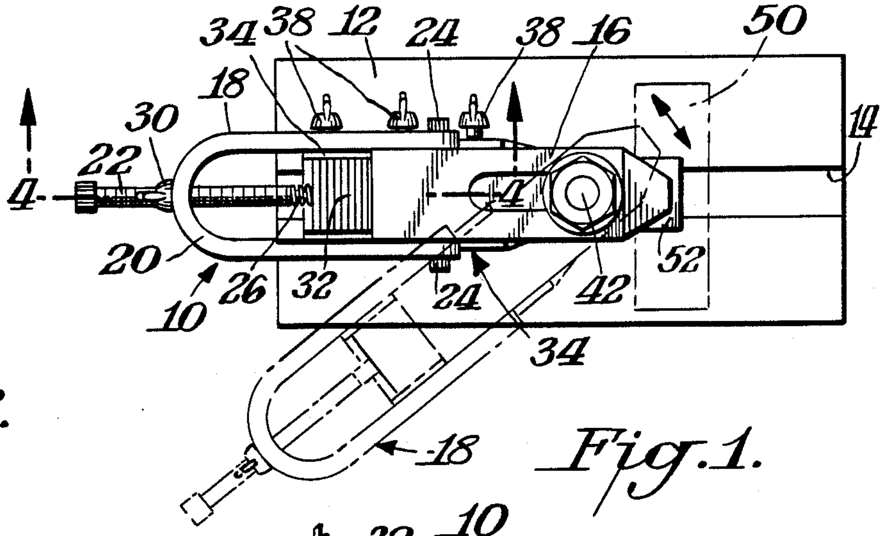
FIG. 2 is a top plan view of the apparatus.

FIG. 2 shows a top plan view of the apparatus 10 of the invention. The workpiece 50 is held onto work surface 12 by means of bolt 42 and nut 44 (not seen). Rotational movement of the clamping apparatus is indicated in phantom and is effected by rotation of the apparatus about the axis of bolt 42. Longitudinal (horizontal) movement of the apparatus and workpiece is effected along the "T" slot in work surface 12. Step clamp 16 is securely affixed to step block 32 by clamp holder 18. Clamp holder 18 comprises "U"-bracket 20 and thumbscrew 22 with resilient end piece 26. Wing nut 30 sets the holder apparatus 18 in place. Also seen in FIG. 2 are wing bolts 38 and plate 52.

Figure 3:
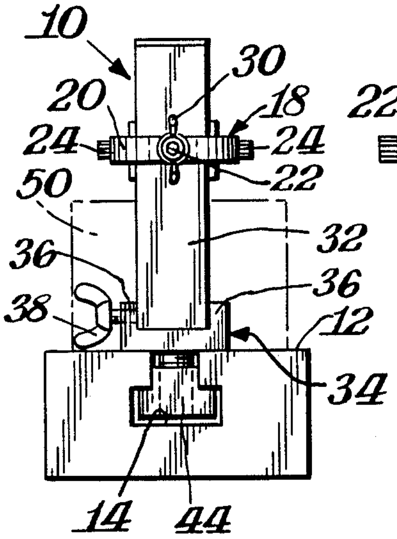
FIG. 3 is a rear elevation of the apparatus.

FIG. 3 shows apparatus 10 in rear elevation. The apparatus 10 is affixed to work surface 12 by nut 44 in "T" slot 14. Holder 18 holds the step clamp 16 (not seen) to step block 32 as shown. Components 20, 22, 24 and 30 have been described previously. Step block 32 is carried in and securely affixed to step block holder 34 between rails 36 by means of wing bolts 38.

Various materials of construction may be used for the components of the holders 18 and 34 of the invention, and steel is preferred.

Figure 4:
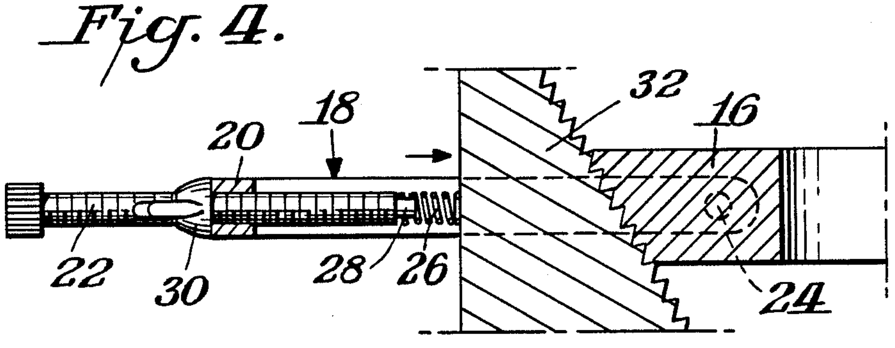
FIG. 4 is a fragmentary cross-sectional view taken substantially along line 4—4 of FIG. 2.

FIG. 4 is a fragmentary cross-section taken substantially along line 4—4 of FIG. 2. The step clamp holder 18 comprises "U"-bracket 10 threadingly engaged with thumbscrew 22 through the "U"-bend. Spring means 26 is compressed against the vertical surface of step block 32 as indicated by the arrow. The spring 26 is held on extension 28 of screw 22. Holder 18 is held to step clamp 16 by bolts 24.

Figure 4A:
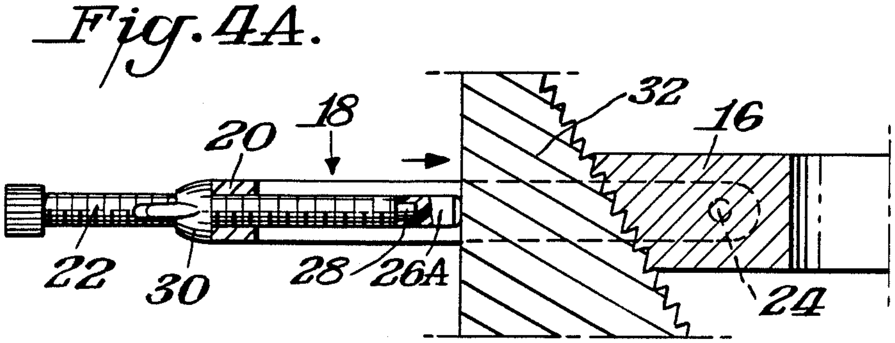
FIG. 4A is the same view as FIG. 4 utilizing an alternative form of a resilient means.

FIG. 4A shows an alternate embodiment of resilient means 26A comprising a rubber pad.

FIG. 5 shows a top plan view of step block holder 34. Holder 34 has opening 40 therein through which bolt 42 passes when in use. Step block 32 is carried on holder base 34 between rails 36 and is secured thereto by wing bolts 38 which extend through at least one of the rails 36.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Clamp apparatus comprising a step clamp having a forward end for holding a workpiece and a rear end having means for affixing said step clamp to a forward vertical face of a step block, and separate means for longitudinally and vertically adjusting said forward end of said step clamp to provide for securing and releasing said workpiece to and from a work surface, wherein said means for affixing said step clamp to said step block comprises a generally "U"-shaped holder assembly having a "U"-bend, said holder assembly affixed to the rear end of said step clamp which enables said holder and step clamp to be removeably attachable to said step block, said holder having thumbscrew means threadingly inserted through the "U"-bend, said thumbscrew means having a thumb adjustment external to the "U"-bend and having a resilient endpiece affixed internal to the "U"-bend adjacent a rear vertical face of said step block, whereby, when said step clamp is adjusted to a desired height on said step block and said thumbscrew assembly is advanced such that said resilient endpiece thereof is forced into tight holding contact with the rear vertical face of said step block and said rear end of said step clamp is affixed to said forward vertical face of said step block, and whereby a rigid combination of step clamp, step block and holder is provided, such that, when a workpiece is removed from said apparatus, the step clamp does not fall away from the step block, thereby avoiding unnecessary time delays in re-setup.

2. The apparatus of claim 1 wherein said resilient endpiece is a spring.

3. The apparatus of claim 1 wherein said resilient endpiece is a rubber pad.

4. The apparatus of claim 1 wherein said step block is affixed to a step block holder, said step block holder comprising a base plate having an opening adjacent one end thereof and means for affixing said step block to said base plate, wherein said means for longitudinally and vertically moving said step clamp is a vertical bolt extending through said opening, said bolt, in combination with a nut threadingly engaged therewith comprising means for removeably attaching the forward end of said step clamp, said step block holder and said work surface, thereby providing for precise longitudinal and rotational adjustment of said clamp apparatus.

5. The apparatus of claim 1 having a plate of a relatively soft material affixed to said forward end of said step clamp, said plate contacting said workpiece when the apparatus is in use.

6. The apparatus of claim 1 wherein said plate is aluminum.

7. The apparatus of claim 1 wherein said plate is plastic.

* * * * *